US008885258B2

(12) United States Patent
Matsuno et al.

(10) Patent No.: US 8,885,258 B2
(45) Date of Patent: Nov. 11, 2014

(54) STACK-TYPE LENS ARRAY AND LENS MODULE (71) Applicant: FUJIFILM Corporation, Tokyo (JP)

(72) Inventors: Ryo Matsuno, Saitama (JP); Satoshi Yoneyama, Saitama (JP); Takashi Koike, Saitama (JP); Kazuhide Hasegawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/939,644

(22) Filed: Jul. 11, 2013

(65) Prior Publication Data
US 2013/0301140 A1 Nov. 14, 2013

Related U.S. Application Data (63) Continuation of application No. PCT/JP2011/080034, filed on Dec. 26, 2011.

(30) Foreign Application Priority Data

Jan. 21, 2011 (JP) .................. 2011-010568

(51) Int. Cl.
G02B 27/10 (2006.01)
B29D 11/00 (2006.01)
G02B 3/00 (2006.01)
G02B 13/00 (2006.01)
G02B 7/02 (2006.01)
G02B 5/00 (2006.01)
G02B 1/11 (2006.01)

(52) U.S. Cl.
CPC ........ G02B 3/0062 (2013.01); B29D 11/00278 (2013.01); G02B 13/0085 (2013.01); G02B 13/001 (2013.01); G02B 7/025 (2013.01); G02B 1/11 (2013.01); G02B 5/005 (2013.01)

USPC ............................................ 359/628; 359/622

(58) Field of Classification Search
CPC ..................... H01L 27/14627; H01L 31/0232; G02B 13/0085; G02B 3/0062
USPC .................. 359/622–624, 618, 628
See application file for complete search history.

(56) References Cited

U.S. PATENT DOCUMENTS 7,187,501 B2 * 3/2007 Wakisaka ...................... 359/622
7,564,496 B2 7/2009 Wolterink et al.
(Continued)

FOREIGN PATENT DOCUMENTS

CN 103154778 6/2013
JP 2002-329851 11/2002
(Continued)

OTHER PUBLICATIONS

International Search Report, PCT/JP2011/080034, Mar. 19, 2012.
(Continued)

Primary Examiner — Alicia M Harrington
(74) Attorney, Agent, or Firm — Young & Thompson (57) ABSTRACT Provided is a stack-type lens array capable of preventing a lens from peeling off due to stress during dicing or vibration and impact when used. The stack-type lens array is formed by stacking and bonding two lens sheets in which micro lenses are arranged on a flat portion at predetermined intervals. Antireflection films are vapor-deposited on a convex surface and a concave surface of the lens and a light shielding film is vapor-deposited such that a circular opening is formed at the center of the concave surface. The opening serves as a diaphragm aperture of the lens. An exposed surface in which neither the antireflection film nor the light shielding film is vapor-deposited is provided outside the light shielding film between adjacent lenses. A dicing line is set at the center of the exposed surface. An adhesive layer is formed in a predetermined pattern on the exposed surface.

20 Claims, 11 Drawing Sheets

(56) References Cited

U.S. PATENT DOCUMENTS

2004/0040648 A1    3/2004    Harden et al.
2013/0194676 A1    8/2013    Sannokyou et al.

FOREIGN PATENT DOCUMENTS

| | | |
|---|---|---|
| JP | 2003-337206 | 11/2003 |
| JP | 3154544 | 9/2009 |
| JP | 2009-279790 | 12/2009 |
| JP | 3160406 | 6/2010 |
| JP | 2010-204632 | 9/2010 |
| WO | 2004/027880 | 4/2004 |
| WO | 2012/043191 | 4/2012 |

OTHER PUBLICATIONS

Japanese Official Action, 2012-553587, Sep. 11, 2013.
CN Notice of Second Office Action dated Mar. 13, 2014, with English translation; Application No. 201180065316.3.
Extented European Search Report—EP 22 85 6059—Jun. 5, 2014.

* cited by examiner

STACK-TYPE LENS ARRAY AND LENS MODULE

BACKGROUND OF THE INVENTION

1. Field of the Invention

The present invention relates to a stack-type lens array formed by stacking and bonding at least two lens sheets each having a plurality of lenses arranged on the plane and a lens module using the stack-type lens array.

2. Description of the Related Art

A lens module of a camera is mounted in a micro device, such as a mobile phone, and it is necessary to further reduce the size of the lens module. In general, a lens or a lens unit is provided with a light shielding member or an antireflection member in order to prevent defects, such as ghost or flare due to the reflection of light from a lens surface. This is similarly applied to a micro lens. However, in the micro lens, in many cases, the light shielding member or the antireflection member is directly formed as a light shielding film or an antireflection film on the lens by vapor deposition or coating.

A method has been proposed which manufactures a large number of lenses and lens modules at a time. JP2003-337206A discloses a stack-type lens array formed by stacking and bonding a plurality of lens sheets each having a plurality of lenses arranged on one sheet. A light absorbing film is formed at the boundary between the lenses. Concave grooves formed in four sides of the lens sheets are fitted to each other and the two lens sheets are positioned so as to overlap each other. The two lens sheets are fixed by adhesion pins which are inserted into pin insertion holes provided at four corners.

JP2009-279790A discloses a camera module with light receiving elements which is manufactured by overlapping two lens sheets each having a plurality of lenses arranged therein with a sensor substrate having a plurality of light receiving elements arranged thereon in the same pattern as the lenses and dicing the laminate into lenses. For each lens, an optical surface shape is transferred to a resin which is filled in an opening provided in a lens substrate by a mold and the opening serves as a diaphragm aperture.

SUMMARY OF THE INVENTION

In general, in the lens unit in which a plurality of lenses overlap each other, a light shielding film for cutting stray light is formed on each lens surface by vapor deposition or coating to prevent flare or ghost. However, in the structure disclosed in JP2009-279790A, it is difficult to form the light shielding film on the lens surface. In JP2003-337206A, since two lens sheets are fixed in the outer circumference portion, it is difficult to cut the lens sheets into individual lens units. When two lens sheets, each having the light shielding film formed thereon by vapor deposition, are overlapped and bonded to each other like the lens sheets disclosed in JP2003-337206A or JP2009-279790A, the adhesive strength between the two lens sheets is reduced since the two lens sheets are bonded at the position where the light shielding film is formed and two bonded lenses peel off due to stress during dicing or vibration and impact while the manufactured lens module is being used.

The invention has been made in view of the above-mentioned problems and an object of the invention is to provide a stack-type lens array capable of preventing a bonded lens from peeling off due to stress during dicing or vibration and impact when the stack-type lens array is used.

According to an aspect of the invention, a stack-type lens array includes at least two lens sheets which are stacked and bonded to each other and each of which includes micro lenses arranged on a flat plate at predetermined intervals. One of the two lens sheets includes at least one of an antireflection layer that is formed so as to include a lens surface of the micro lens and a light shielding layer that is formed so as to have a diaphragm aperture at the center of the lens surface of the micro lens, and an adhesive layer that is patterned on an exposed surface of the lens sheet which is provided on an outer circumferential side of the antireflection layer and the light shielding layer, on an inner surface thereof which faces the inner surface of the other lens sheet when the two lens sheets are stacked. A portion to which the adhesive layer is bonded in the inner surface of the other lens sheet which faces the inner surface of the one lens sheet when the two lens sheets are stacked is the exposed surface of the lens sheet.

At least one of the antireflection layer and the light shielding layer may be formed on the inner surface of the other lens sheet which faces the inner surface of the one lens sheet when the two lens sheets are stacked. The antireflection layers, the light shielding layers, and the adhesive layers of the micro lenses which are adjacent to each other are separated from each other by the exposed surface of the lens sheet. A treatment for improving adhesion may be performed for at least the exposed surface of the lens sheet on which the adhesive layer is formed. The adhesive layer may be an adhesive material which is patterned and applied in advance, a double-sided adhesive sheet which is patterned, cut, and attached in advance, or a film or a sheet in which an adhesive material is transferred to both surfaces thereof which are patterned in advance.

According to another aspect of the invention, there is provided a lens module that is obtained by dicing the stack-type lens array at an intermediate position between the micro lenses which are adjacent to each other. The stack-type lens array may be diced into the lens module along the exposed surface of the lens sheet. According to still another aspect of the invention, there is provided an imaging unit including the lens module according to the above-mentioned aspect.

According to the invention, the adhesive layer is directly bonded to a portion of the lens sheet in which, for example, the antireflection film or the light shielding film is not vapor-deposited. Therefore, the adhesive strength between two lenses by the adhesive material is improved and the lens does not peel off due to vibration and impact during dicing.

DESCRIPTION OF THE PREFERRED EMBODIMENTS

Figure 1:
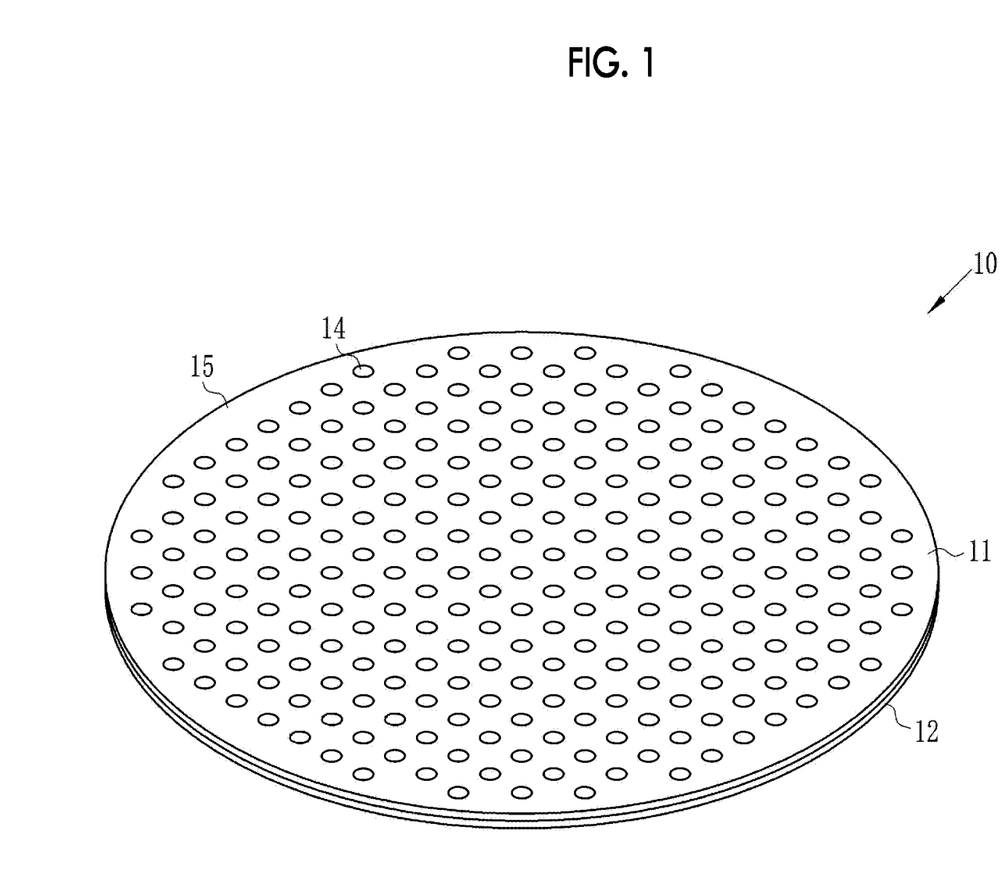
FIG. 1 is a perspective view illustrating the outward appearance of a stack-type lens array.

As shown in FIG. 1, a stack-type lens array 10 is formed by stacking and bonding a lens sheet 11 in which aspheric micro lenses (hereinafter, simply referred to as lenses) 14 are arranged on a flat portion 15 at predetermined intervals to a lens sheet 12 which has a reverse shape of the lens sheet 11.

Figure 2:
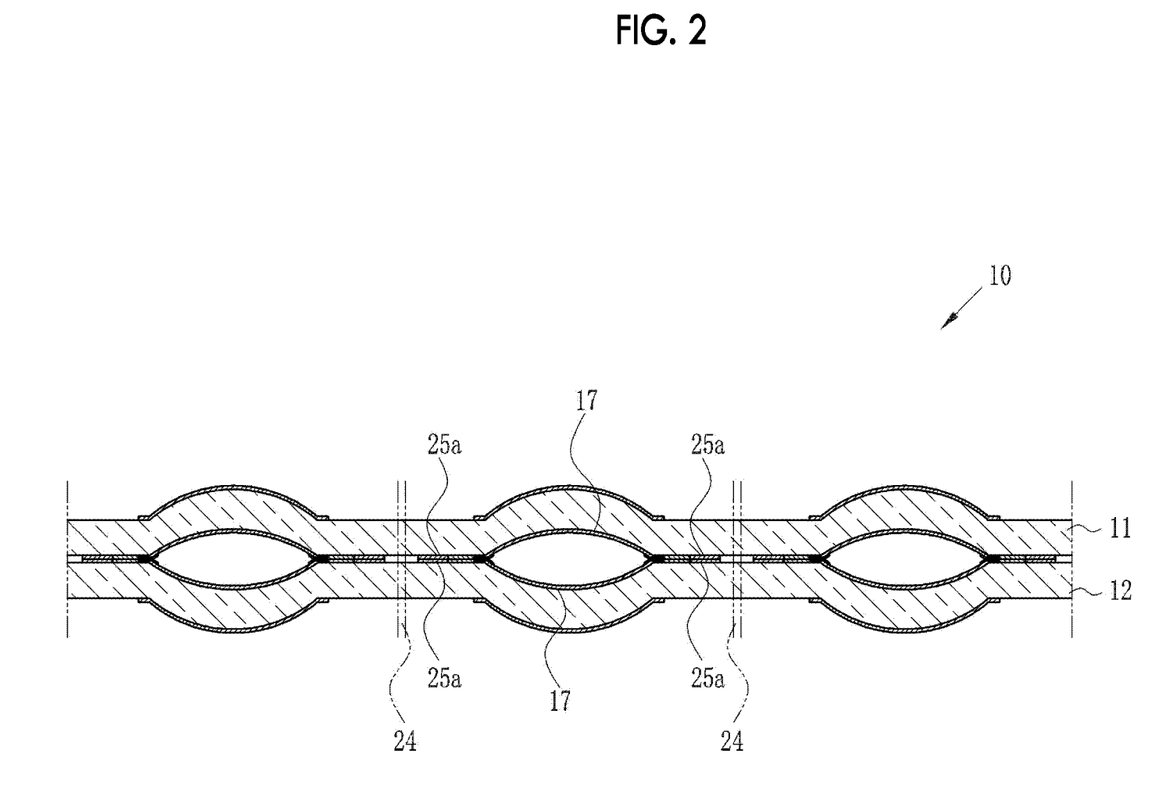
FIG. 2 is an enlarged cross-sectional view illustrating a portion of the stack-type lens array.

As shown in FIG. 2, convex surfaces 16 and concave surfaces 17, which are lens surfaces of the lenses 14, are formed on the front and rear surface of the lens sheets 11 and 12 and the lens sheets 11 and 12 overlap each other such that the inner concave surfaces 17 face each other. For example, an ultraviolet-curable adhesive material is applied onto flat portions 15 of the rear surfaces of the lens sheets 11 and 12 in which the concave surfaces 17 are provided to form an adhesive layer 25. When the lens sheets 11 and 12 are positioned and overlap each other such that the centers of the lenses 14 are aligned with each other, the adhesive layers 25 come into close contact with each other. Then, ultraviolet rays are radiated to solidify the adhesive layer 25. In this way, the stack-type lens array 10 is manufactured.

A treatment for improving adhesion is performed in the range of the rear surface of the flat portion 15 in which the adhesive layer 25 is formed. Examples of the treatment for improving adhesion include the cleaning of the surface with, for example, water or an organic solvent, the polishing of the surface with, for example, a polishing agent, surface oxidization or etching using, for example, acid or alkali, and a method of radiating ozone, plasma, or ultraviolet rays to reform the surface or to improve energy. These treatments may be omitted according to the state of the surface. In addition, fine convex and concave portions may be formed in the surface of a mold for forming a lens array, a reverse shape thereof may be transferred to the lens array, and fine convex and concave portions for improving adhesion may be formed at least in the range in which the adhesive layer 25 is formed.

Figure 3:
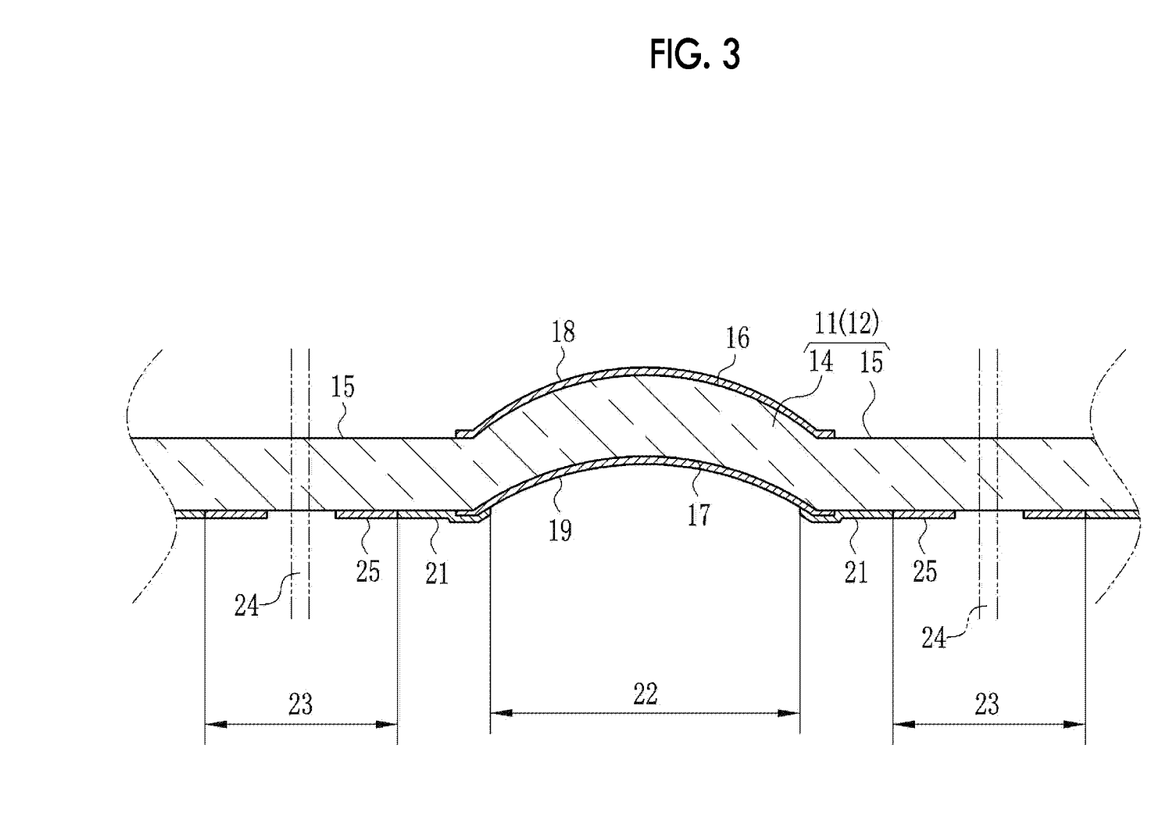
FIG. 3 is an enlarged cross-sectional view illustrating a micro lens of a lens sheet.

As shown in FIG. 3, antireflection films (antireflection layers) 18 and 19 are vapor-deposited from the convex surface (lens surface) 16 and the concave surface 17 of the lens 14 to the flat portion 15. In addition, a light shielding film (light shielding layer) 21 is vapor-deposited from a peripheral portion of the concave surface 17 to the flat portion 15 such that a circular opening 22 is formed at the center of the concave surface 17 and the opening 22 serves as a diaphragm aperture of the lens 14. An exposed surface 23 on which neither the antireflection film 19 nor the light shielding film 21 is vapor-deposited is provided on the outer circumferential side of the light shielding film 21 and the adhesive layer 25 is formed outside the edge of the light shielding film 21. The adhesive layers 25 of adjacent lenses 14 are formed so as not to contact each other (see FIGS. 5 to 8) and a dicing line 24 is set at the center of the exposed surface 23 which remains between the adhesive layers 25.

Figure 4:
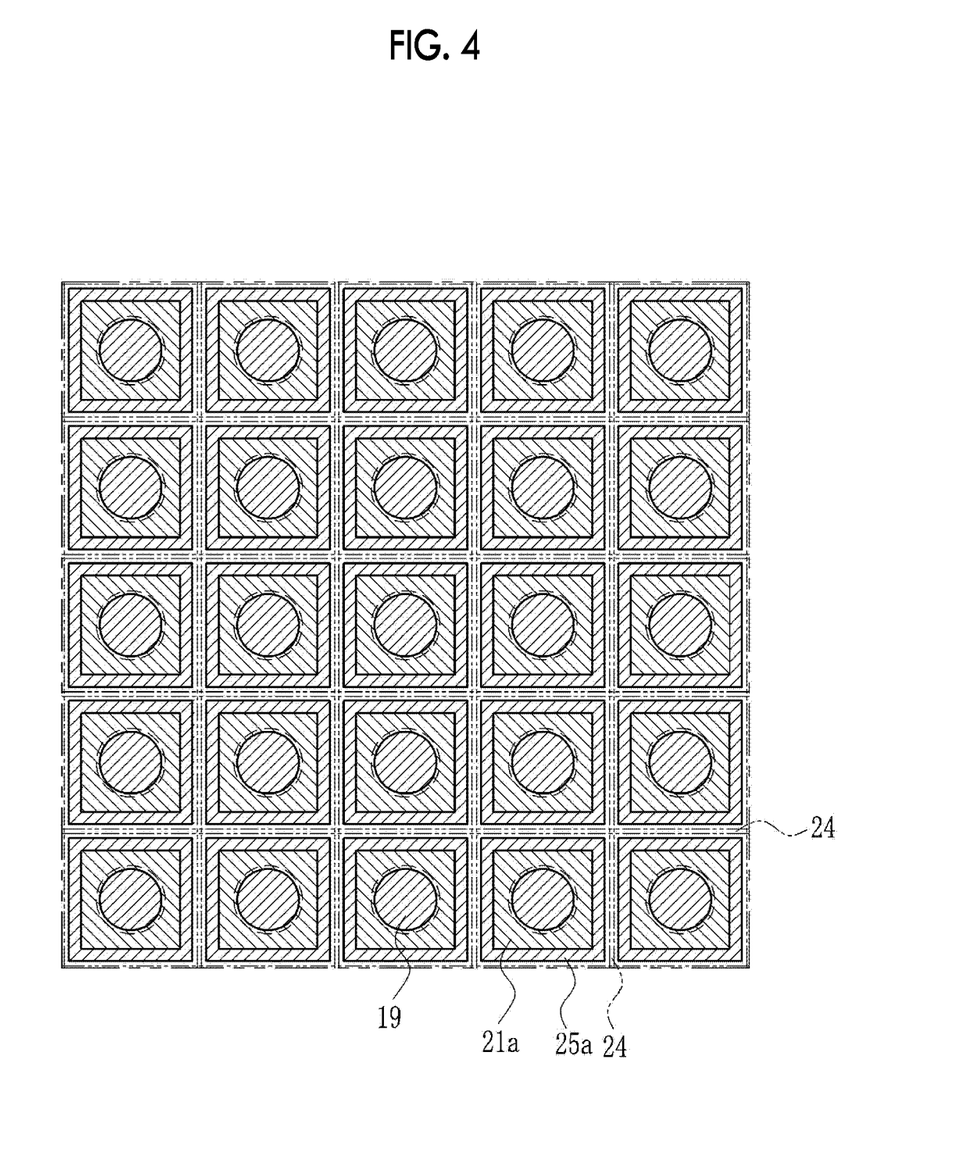
FIG. 4 is a schematic diagram illustrating the arrangement of an antireflection film, a light shielding film, an adhesive layer, and a dicing line.
Figure 5:
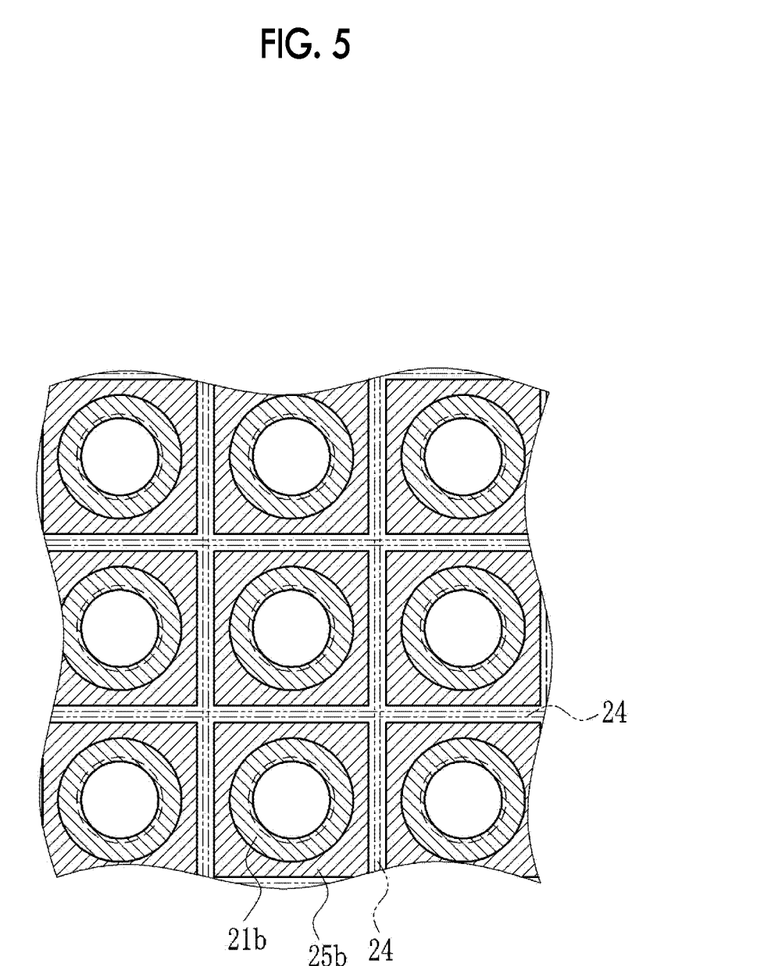
FIG. 5 is a schematic diagram illustrating a light shielding film and an adhesive layer which are patterned in another shape.
Figure 6:
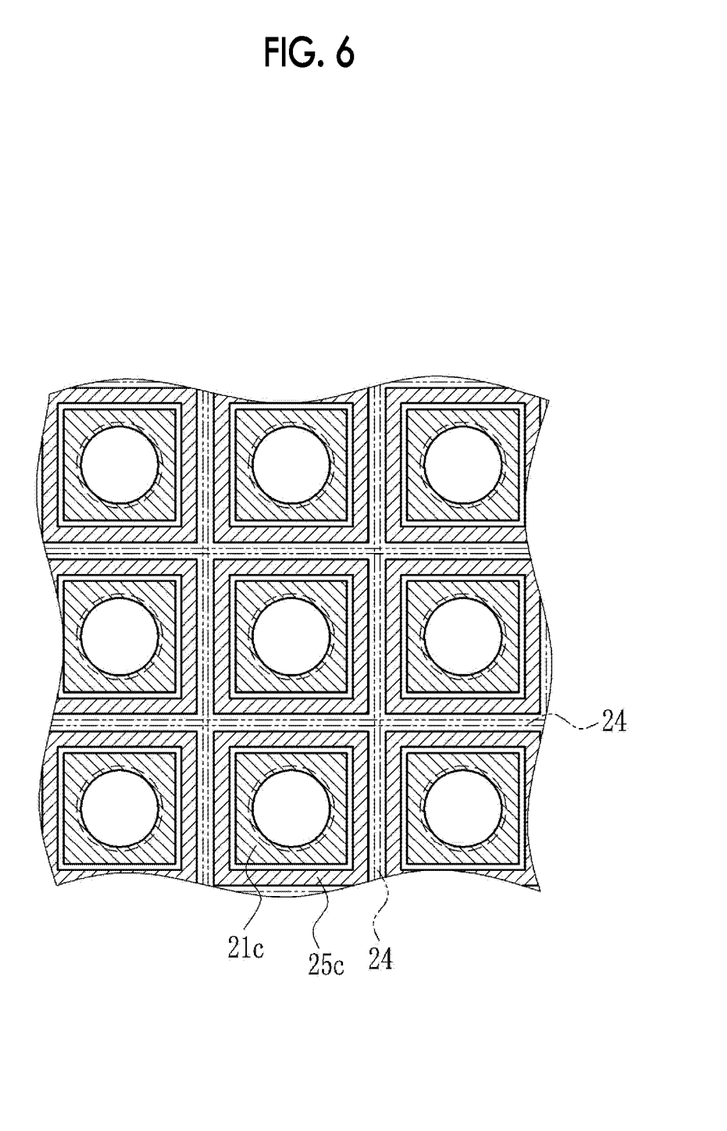
FIG. 6 is a schematic diagram illustrating a pattern in which a gap is provided between the light shielding film and the adhesive layer.
Figure 7:
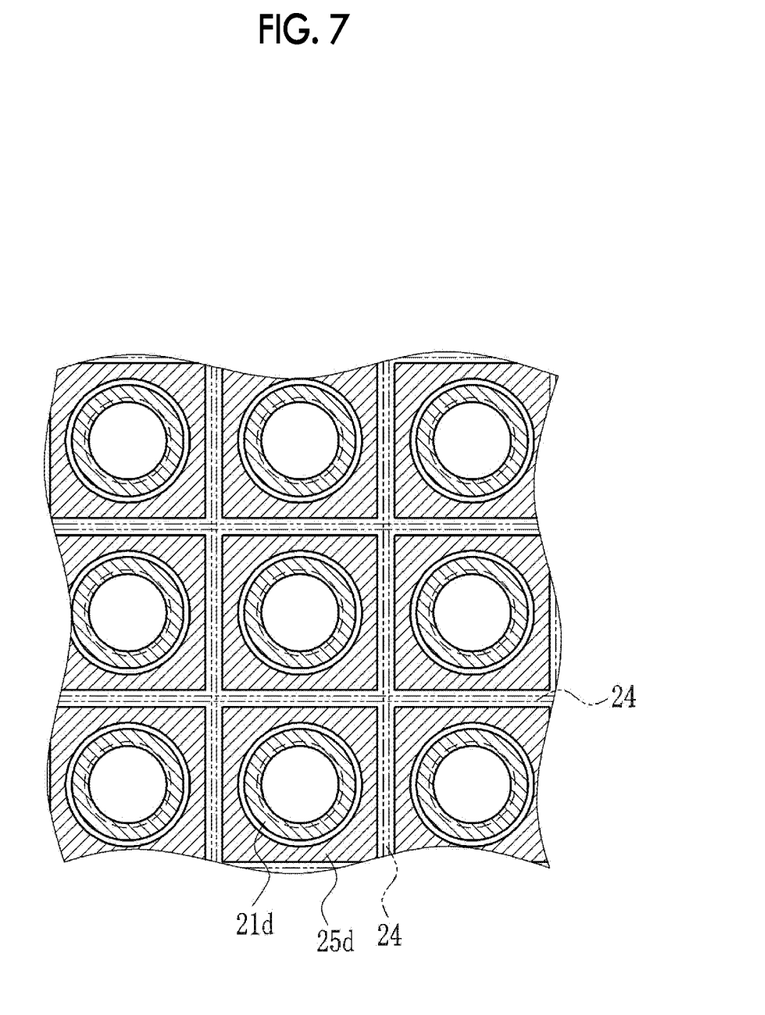
FIG. 7 is a schematic diagram illustrating another pattern in which a gap is provided between the light shielding film and the adhesive layer.

As shown in FIG. 4, an ultraviolet-curable adhesive material 25a which is applied as the adhesive layer 25 is applied in the range from the outer circumferential edge of the light shielding film 21a to the front side of the position where the dicing line 24 is set. For the application range of the adhesive material 25a, as shown in FIG. 5, an adhesive material 25b may be applied in the range from the outer circumferential edge of a light shielding film 21b to the front side of the position where the dicing line 24 is set even when the outer circumferential edge of the light shielding film 21b has a circular shape. In addition, as shown in FIGS. 6 and 7, adhesive materials 25c and 25d may be applied with a gap from the outer circumferential edges of light shielding films 21c and 21d.

Figure 8:
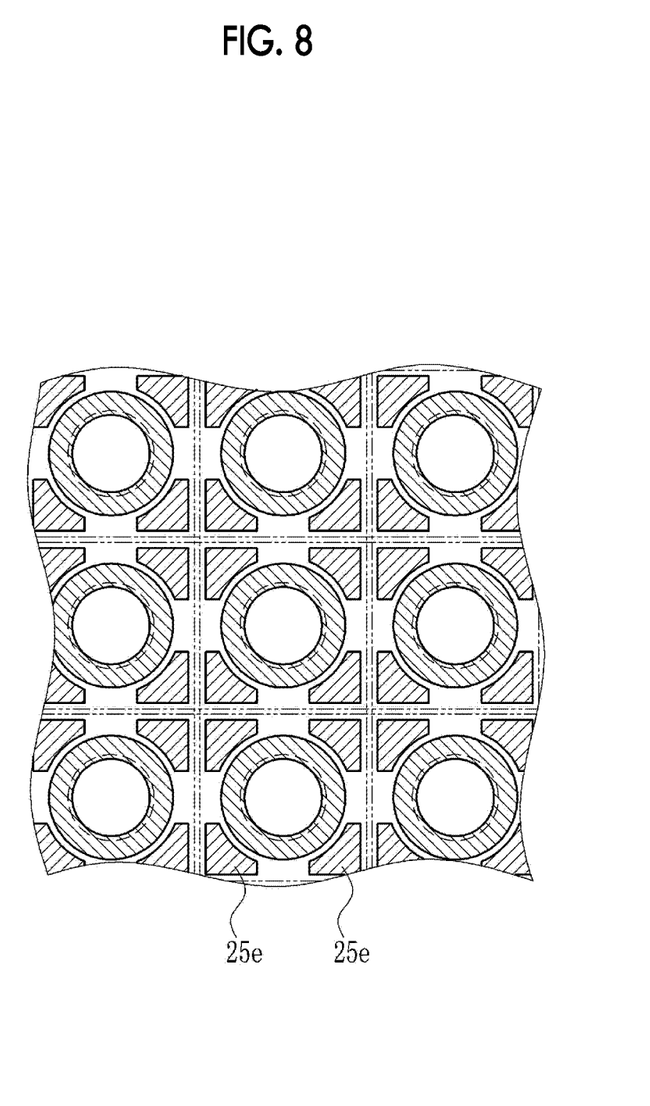
FIG. 8 is a schematic diagram illustrating a pattern in which four adhesive layers are provided.

As shown in FIG. 8, an adhesive material 25e may be applied in the range which is patterned in an arbitrary shape. In addition, the adhesive materials 25a to 25e may be formed by an apparatus, such as a dispenser or an ink jet apparatus, or a printing method, such as screen printing or offset printing. Alternatively, a double-sided adhesive sheet which is cut out in the same shape as that of the adhesive materials 25a to 25e shown in FIGS. 4 to 8 may be attached. Alternatively, an adhesive material may be partially or entirely transferred to both surfaces of a film or a sheet which is cut out in the same shape as that of the adhesive materials 25a to 25e shown in FIGS. 4 to 8 and the film or the sheet having the adhesive material transferred to both surfaces thereof may be attached.

The adhesive layer 25 may be made of an adhesive material other than an energy-curable adhesive material. In addition, it is not preferable that the adhesive materials 25a to 25e be diced. However, the dicing of the adhesive material does not cause a problem depending on a dicing apparatus or a dicing method. Therefore, no gap may be provided between adjacent adhesive layers 25.

Figure 9:
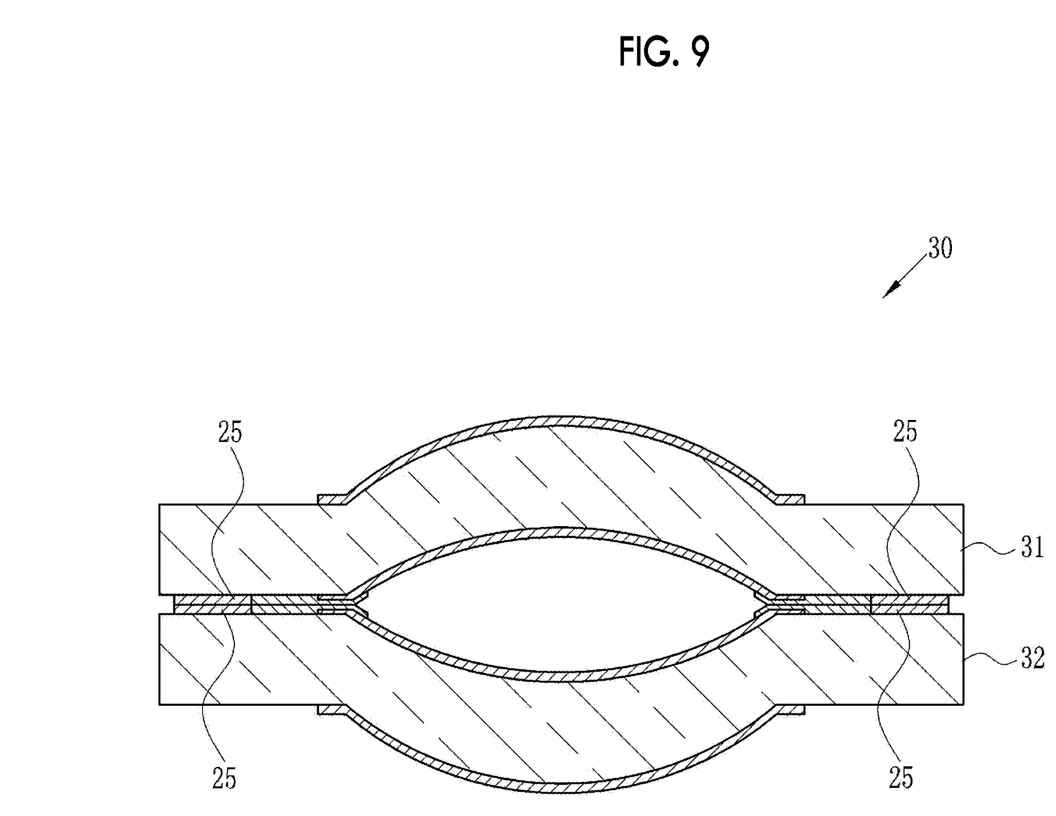
FIG. 9 is a cross-sectional view illustrating a lens module.

As shown in FIG. 9, the stack-type lens array 10 is cut into individual lens modules 30 along the dicing lines 24 (see FIGS. 2 to 8). Since each adhesive layer 25 is closely adhered and solidified, a lens piece 31 which is cut out from the lens sheet 11 and a lens piece 32 which is cut out from the lens sheet 12 are strongly bonded to each other.

The antireflection film, the light shielding film, and the adhesive layer may not be provided on two lens sheets. The antireflection film or the light shielding film may be vapor-deposited on at least one of the opposite surfaces of two lens sheets and the adhesive layer may be formed on the outer circumferential side of the antireflection film or the light shielding film. In addition, the antireflection films 18 and 19 and the light shielding film 21 may not be formed by vapor deposition, but may be formed by coating or printing.

Figure 10:
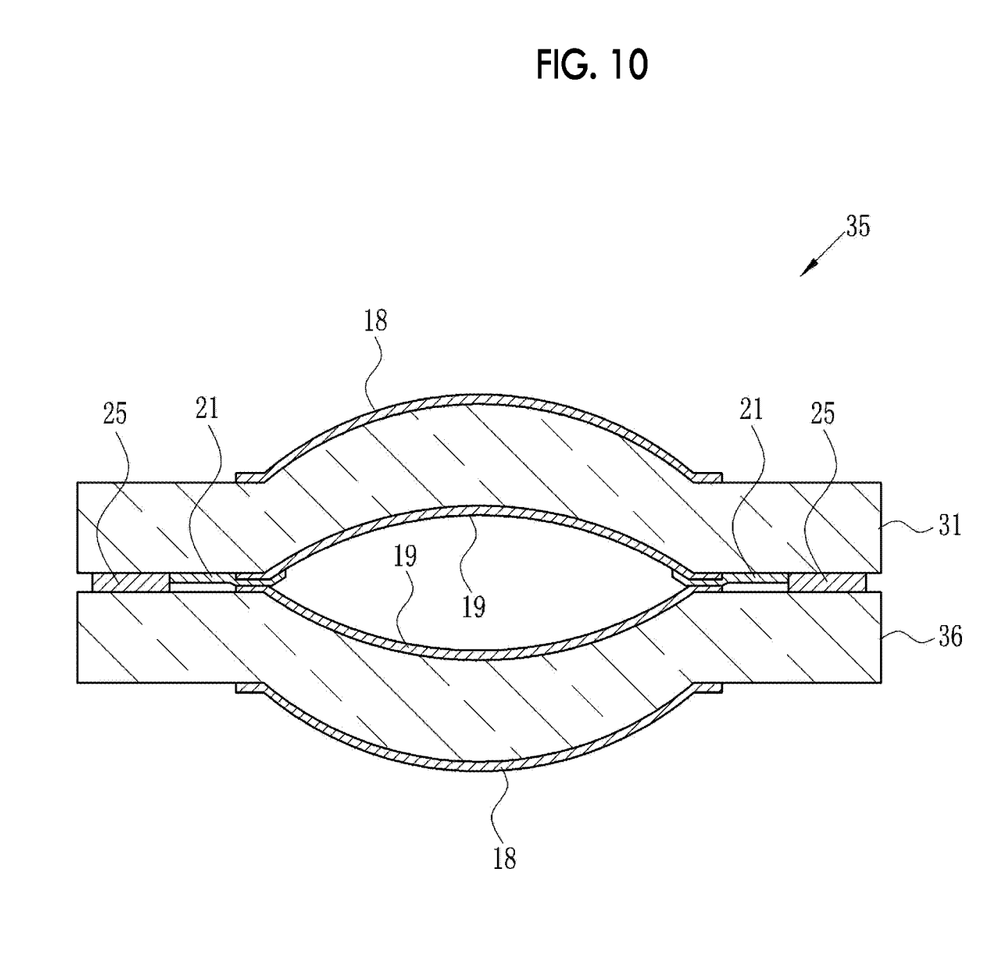
FIG. 10 is a cross-sectional view illustrating another lens module.

As shown in FIG. 10, for example, a lens module 35 includes a lens piece 31 in which the antireflection films 18 and 19, the light shielding film 21, and the adhesive layer 25 are formed and a lens piece 36 in which only the antireflection films 18 and 19 are formed. Neither the light shielding film 21 nor the adhesive layer 25 is formed on the outer circumferential side of the antireflection film 19 on the rear surface of the lens piece 36. A portion of the lens piece 31 to which the adhesive layer 25 is bonded is the exposed surface 23 of the lens sheet and a treatment for improving adhesion is performed for the exposed surface 23. In addition, the antireflection films 18 and 19 may not be formed in the lens piece 36.

Figure 11:
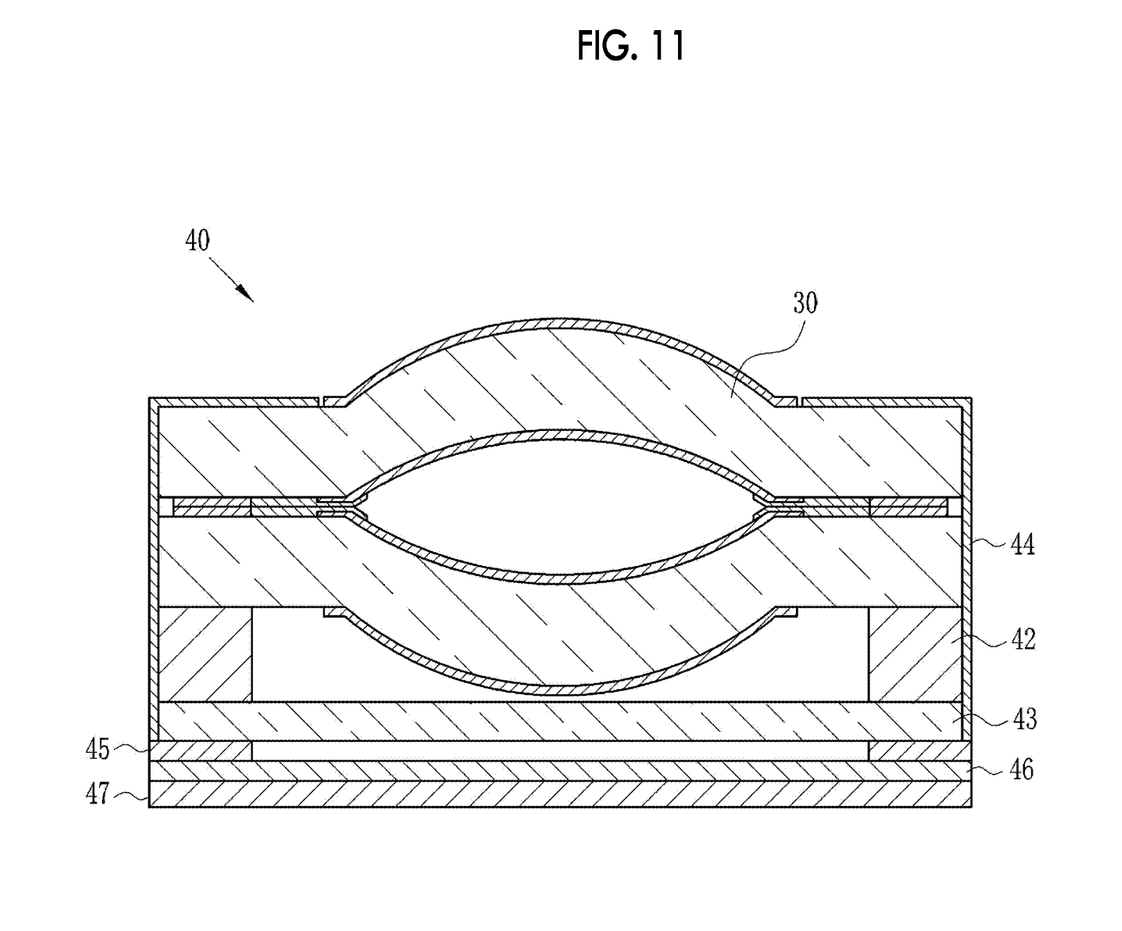
FIG. 11 is a schematic cross-sectional view illustrating an imaging unit into which the lens module is incorporated.

As shown in FIG. 11, an infrared cut filter 43 is attached to the lens module 30 with spacers 42 interposed therebetween and an outer circumferential portion of the laminate is covered with a housing or resin layer 44 with a light shielding property. Then, a circuit board 47 having an image sensor (imaging element) 46 provided thereon is fixed and integrated with the infrared cut filter 43 with spacers 45 interposed therebetween. In this way, an imaging unit 40 is manufactured.

In the above-described embodiment, two lenses are stacked. However, the number of lens pieces forming the lens module may be three or more. In this case, three or more lens sheets may be stacked to manufacture a stack-type lens array and the stack-type lens array may be diced to manufacture a lens module.

Next, the operation and effect of the stack-type lens array 10 and the lens module 30 according to the embodiment of the invention will be described. A plurality of lenses 14 are manufactured by one lens sheet 11 or 12 and two lens sheets are bonded so as to overlap each other, thereby manufacturing the stack-type lens array 10. Therefore, the manufacturing efficiency is high and costs are significantly reduced, as compared to when the lens modules 30 are manufactured one by one.

In the lens sheets 11 and 12, the exposed surface 23 on which the light shielding film 21 or the antireflection film 19 is not formed is provided in the flat portion 15 and the adhesive layer 25 is formed on the exposed surface 23. However, in the case of an inorganic material, such as the light shielding film 21 or the antireflection film 19, the adhesive strength of the energy-curable adhesive material is weak and the film is likely to peel off after it is bonded. However, when the individual lenses 14 are formed, the exposed surface 23 is provided in the flat portion 15, which is the outer circumferential portion of the lens, and the adhesive layer 25 is formed on the exposed surface 23 such that the adhesive layer (adhesive material) 25 comes into direct contact with the flat portion 15 of the lens sheets 11 and 12 made of an organic material. Therefore, strong adhesive strength is maintained and the bonded portion does not peel off even when stress is applied during dicing.

What is claimed is:

1. A stack-type lens array comprising:
at least two lens sheets which are stacked and bonded to each other and each of which includes micro lenses arranged on a flat plate at predetermined intervals,
wherein one of the two lens sheets includes at least one of an antireflection layer that is formed so as to include a lens surface of the micro lens and a light shielding layer that is formed so as to have a diaphragm aperture at the center of the lens surface of the micro lens, and an adhesive layer that is patterned on an exposed surface of the lens sheet which is provided on an outer circumferential side of the antireflection layer and the light shielding layer, on an inner surface thereof which faces the inner surface of the other lens sheet when the two lens sheets are stacked, and
a portion to which the adhesive layer is bonded in the inner surface of the other lens sheet which faces the inner surface of the one lens sheet when the two lens sheets are stacked is the exposed surface of the lens sheet.

2. The stack-type lens array according to claim 1, wherein at least one of the antireflection layer and the light shielding layer is formed on the inner surface of the other lens sheet which faces the inner surface of the one lens sheet when the two lens sheets are stacked.

3. The stack-type lens array according to claim 2, wherein the antireflection layers, the light shielding layers, and the adhesive layers of adjacent micro lenses are separated from each other by the exposed surface of the lens sheet.

4. The stack-type lens array according to claim 3, wherein a treatment for improving adhesion is performed for the exposed surface of the lens sheet on which the adhesive layer is formed.

5. The stack-type lens array according to claim 3, wherein the adhesive layer is an adhesive material which is patterned and applied in advance, a double-sided adhesive sheet which is patterned, cut, and attached in advance, or a film or a sheet in which an adhesive material is transferred to both surfaces thereof which are patterned in advance.

6. The lens module according to claim 3 that is obtained by dicing the stack-type lens array at an intermediate position between the adjacent micro lenses,
wherein the stack-type lens array is diced into each lens module along the exposed surface of the lens sheet.

7. The stack-type lens array according to claim 2,
wherein a treatment for improving adhesion is performed for the exposed surface of the lens sheet on which the adhesive layer is formed.

8. The stack-type lens array according to claim 2,
wherein the adhesive layer is an adhesive material which is patterned and applied in advance, a double-sided adhesive sheet which is patterned, cut, and attached in advance, or a film or a sheet in which an adhesive material is transferred to both surfaces thereof which are patterned in advance.

9. A lens module that is obtained by dicing the stack-type lens array according to claim 2 at an intermediate position between the adjacent micro lenses.

10. The stack-type lens array according to claim 1,
wherein the antireflection layers, the light shielding layers, and the adhesive layers of adjacent micro lenses are separated from each other by the exposed surface of the lens sheet.

11. The stack-type lens array according to claim 10,
wherein a treatment for improving adhesion is performed for the exposed surface of the lens sheet on which the adhesive layer is formed.

12. The stack-type lens array according to claim 3,
wherein the adhesive layer is an adhesive material which is patterned and applied in advance, a double-sided adhesive sheet which is patterned, cut, and attached in advance, or a film or a sheet in which an adhesive material is transferred to both surfaces thereof which are patterned in advance.

13. A lens module that is obtained by dicing the stack-type lens array according to claim 10 at an intermediate position between the adjacent micro lenses.

14. A lens module according to claim 3 that is obtained by dicing the stack-type lens array at an intermediate position between the adjacent micro lenses,
wherein the stack-type lens array is diced into each lens module along the exposed surface of the lens sheet.

15. An imaging unit comprising:
the lens module according to claim 14.

16. The stack-type lens array according to claim 1,
wherein a treatment for improving adhesion is performed for the exposed surface of the lens sheet on which the adhesive layer is formed.

17. The lens module according to claim 16 that is obtained by dicing the stack-type lens array at an intermediate position between the adjacent micro lenses,
wherein the stack-type lens array is diced into each lens module along the exposed surface of the lens sheet.

18. The stack-type lens array according to claim 1,
wherein the adhesive layer is an adhesive material which is patterned and applied in advance, a double-sided adhesive sheet which is patterned, cut, and attached in advance, or a film or a sheet in which an adhesive material is transferred to both surfaces thereof which are patterned in advance.

19. A lens module that is obtained by dicing the stack-type lens array according to claim 1 at an intermediate position between the adjacent micro lenses.

20. An imaging unit comprising:
the lens module according to claim 19.

* * * * *